United States Patent
Mazuir et al.

(10) Patent No.: US 10,699,573 B1
(45) Date of Patent: *Jun. 30, 2020

(54) DEVICE LOCATOR

(71) Applicant: Apple Inc., Cupertino, CA (US)

(72) Inventors: Clarisse Mazuir, San Jose, CA (US); Matthew E. Last, San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/241,154

(22) Filed: Jan. 7, 2019

Related U.S. Application Data

(63) Continuation of application No. 15/267,870, filed on Sep. 16, 2016, now Pat. No. 10,176,718.

(60) Provisional application No. 62/233,198, filed on Sep. 25, 2015.

(51) Int. Cl.
 *G08G 1/123* (2006.01)

(52) U.S. Cl.
 CPC .................... *G08G 1/123* (2013.01)

(58) Field of Classification Search
 CPC .......... G08G 1/123; G08G 1/00; G08G 1/005; G08G 1/127; G08G 1/13; G06F 3/00; G06F 3/01; G06F 3/03; G01S 5/00; G01S 5/02; G01S 5/0205; G01S 5/0284; G01S 5/0289; G01S 13/00; G01S 13/66; G01S 13/68; G01S 13/72
 See application file for complete search history.

(56) References Cited

U.S. PATENT DOCUMENTS

| | | |
|---|---|---|
| 10,176,718 B1 * | 1/2019 | Mazuir .................. G08G 1/123 |
| 2010/0114488 A1 | 5/2010 | Khamharn et al. |
| 2012/0197519 A1 | 8/2012 | Richardson |
| 2013/0188837 A1 | 7/2013 | Takahashi |
| 2014/0213176 A1 | 7/2014 | Medndelson |
| 2014/0232569 A1 | 8/2014 | Skinder et al. |
| 2014/0266800 A1 | 9/2014 | Koukoumidis et al. |
| 2014/0292541 A1 | 10/2014 | Korman |
| 2015/0039224 A1 | 2/2015 | Tuukkanen et al. |
| 2015/0373482 A1 | 12/2015 | Barnard et al. |
| 2016/0046285 A1 | 2/2016 | Kim et al. |
| 2016/0163197 A1 | 6/2016 | Levy et al. |

OTHER PUBLICATIONS

BCM4752 Integrated Multi-Constellation GNSS Receiver, BROADCOM, https://www.broadcom.com/products/wireless/gnss-gps-socs/bcm4752#, accessed Oct. 11, 2017.

"Navigation Boost: Explore the Great Indoors with Broadcom," Broadcom Blog Squad, Jan. 12, 2012, https://www.broadcom.com/blog/navigation-boost-explore-the-great-indoors-with-broadcom, access Oct. 11, 2017.

(Continued)

*Primary Examiner* — Ryan W Sherwin
(74) *Attorney, Agent, or Firm* — Polsinelli PC

(57) ABSTRACT

Aspects of the present disclosure involve a method for determining the location of a device. The current disclosure presents a technique for identifying the location of the device using a secondary device. In one embodiment, the secondary device retrieves the location of a parked vehicle. Using the location of the parked vehicle in conjunction with its own location, the secondary device is able to determine a route to the parked vehicle. Sensors are used to parametric data. Wireless networks are also used to obtain localization information.

20 Claims, 10 Drawing Sheets

(56) References Cited

OTHER PUBLICATIONS

Peters, "How Your Car Can Find You a Parking Spot Without Circling the Block," Fast Company, Jan. 21, 2015, https://www.fastcompany.com/3040684/how-your-car-can-find-you-a-parking-spot-without-circling-the-block, accessed Oct. 11, 2017.

Garling, "Smartphone Movements Could Reveal Empty Parking Spots," MIT Technology Review, Sep. 15, 2014, https://www.technologyreview.com/s/530671/smartphone-movements-could-reveal-empty-parking-spots/, accessed Oct. 11, 2017.

Kopecký et al., "ParkJam: Crowdsourcing Parking Availability Information with Linked Data (Demo)," Knowlege Media Institute, The Open University, UK, 9th Extended Semantic Web Conference (ESWC 2012), May 27-31, 2012, Heraklion, Greece.

\* cited by examiner

| TIME 502 | COORDINATES 504 | GPS 506 | DIRECTION 508 | DISTANCE 510 | IMAGE 512 | ELEVATION 514 | SPEED 516 |
|---|---|---|---|---|---|---|---|
| 0:00 | X,Y | 39°44.349'N, 104°59.082'W | N | 80ft | | | 10mph |
| 0:05 | X,Y2 | 0 | N | 200 ft | QR Code 510 | 0 | 5mph |
| 0:08 | X2,Y2 | 0 | W | 150ft | | 10ft | 5mph |
| 0:12 | X2,Y3 | 0 | N | 100ft | QR Code 003 | 0 | 8mph |
| 0:14 | X3,Y3 | | E | 30ft | | 0 | 3mph |
| | | | ⋮ | | | | |

DEVICE LOCATOR

CROSS-REFERENCE TO RELATED APPLICATIONS

This application is a continuation of U.S. patent application Ser. No. 15/267,870, filed Sep. 16, 2016, entitled "DEVICE LOCATOR," which is related to and claims priority under 35 U.S.C. § 119(e) to U.S. Patent Application No. 62/233,198, filed Sep. 25, 2015, entitled "DEVICE LOCATOR," each of which are incorporated herein by reference in its entirety.

TECHNICAL FIELD

This disclosure relates generally to a system for locating a device, and more specifically to determining the location of a device using a combination of location details associated with the device.

BACKGROUND

People often become distracted and forget where they parked their car. It can be quite frustrating exiting the mall or the airport and staring into a vast sea of parked cars wondering where your car is parked. Existing solutions for finding a parked car are not very sophisticated or effective. For example, many cars are equipped with remotely activated horns or lights so that a person can depress a button on their key fob to honk the horn, turn on the lights, or pulse the alarm. This solution can create a disturbance to those within the vehicle's surroundings, and is limited to line of sight or hearing range. Another solution involves using global positioning data and an application, such as those available through mobile phones, to recall coordinates of a vehicle location and help guide a user back to that location. Such solutions are limited, as Global Positioning System (GPS) signals can be unreliable in areas with tall buildings, in parking structures and other indoor spaces.

SUMMARY

A system includes a first device that determines a location of a second device. In one embodiment, the second device retrieves the location of a parked vehicle. Using the location of the parked vehicle in conjunction with its own location, the second device is able to determine a route to the parked vehicle. Briefly described, and according to one embodiment, aspects of the present disclosure generally relate to systems and methods for locating a parked device.

According to one embodiment, a method for determining a location of a vehicle includes obtaining, using a processor, a first location obtained at a first time instance, the first location associated with the vehicle at the first time instance, the first location derived based on recognizing a known feature in an image wherein the known feature is associated with a location identifier, determining, using the processor, a second location using a trigonometric identity from detected radio frequency waves, determining, using the processor, a direction from the second location to the first location, and displaying, using the processor, a visual indication of the direction from the second location to the first location.

According to another embodiment, a system for determining a location of a vehicle includes a memory and a processor to execute computer-readable instructions stored in the memory to perform operations including obtaining a first location obtained at a first time instance, the first location associated with the vehicle at the first time instance, the first location derived based on recognizing a known feature in an image wherein the known feature is associated with a location identifier, determining a second location using a trigonometric identity from detected radio frequency waves, determining a direction from the second location to the first location, and displaying a visual indication of the direction from the second location to the first location.

According to an additional embodiment, a computer-readable data storage medium includes instructions that, when executed by a processor of a device, cause the device to perform operations including obtaining, a first location obtained at a first time instance, the first location associated with a vehicle at the first time instance, the first location derived based on recognizing a known feature in an image wherein the known feature is associated with a location identifier, determining a second location using a trigonometric identity from detected radio frequency waves, determining a direction from the second location to the first location, and displaying a visual indication of the direction from the second location to the first location.

These and other aspects, features, and benefits of the present disclosure will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

FIG. 5 shows a representative table of a database for storing attributes associated with the location of a vehicle.

DETAILED DESCRIPTION

Figure 1:
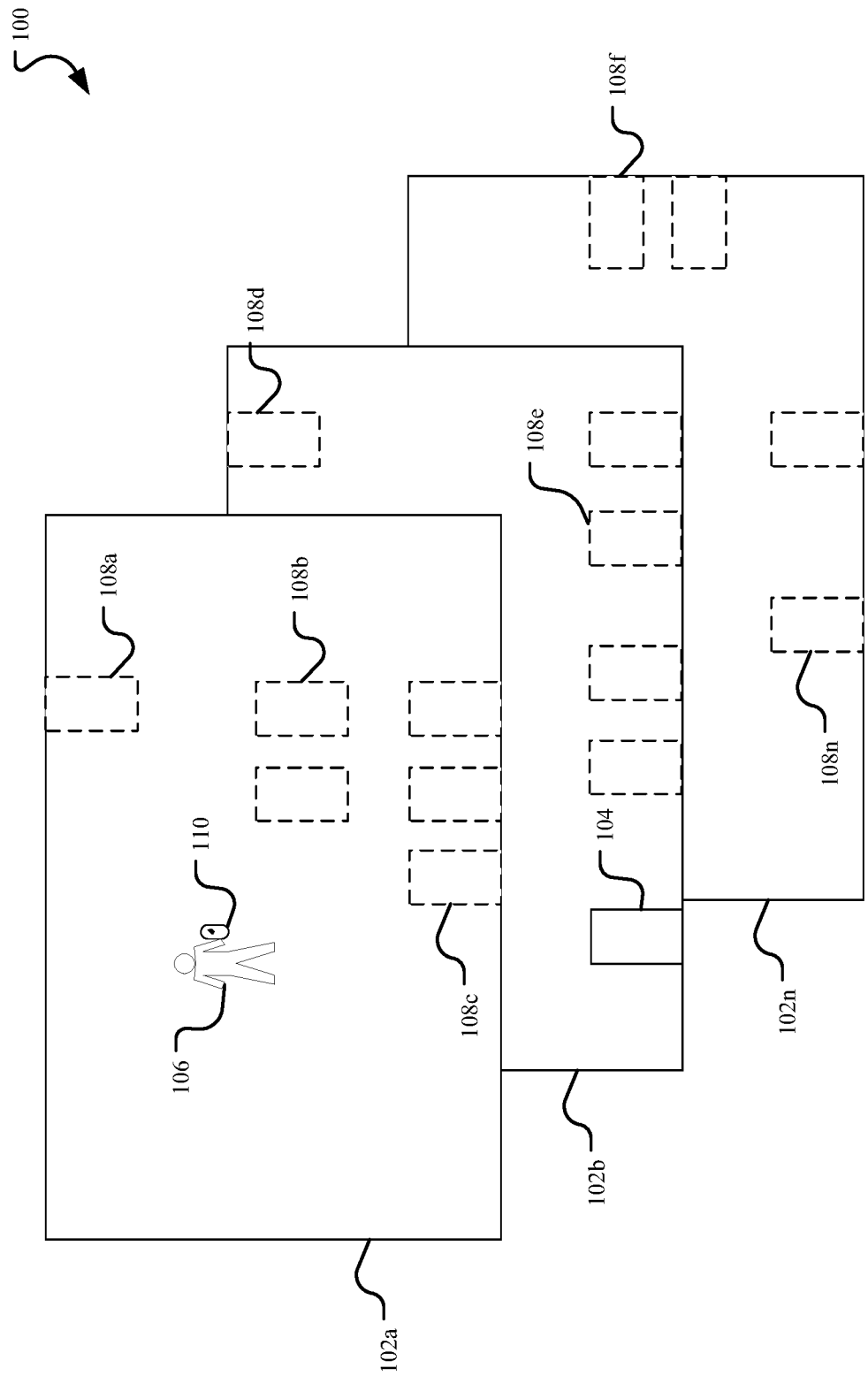
FIG. 1 is a diagram illustrating a general parking structure.

Aspects of the present disclosure involve systems, methods, devices and the like, for locating a device, such as a vehicle. In one embodiment, an application running on a wireless device can use the location of the vehicle and the location of the wireless device to determine a route and/or direction to the vehicle. In one example, the wireless device receives location information from the vehicle at or after the time the vehicle is parked. By knowing and/or determining the location of the parked vehicle and the wireless device, the wireless device can route the user of the wireless device to the location of the vehicle or otherwise provide some indication as to a direction or heading to the location of the vehicle. For example, an application running on a mobile device with limited GPS information, can perform triangulation, or perform other such localization processes to identify the current location of the vehicle. Using the location of the vehicle, a wireless device may provide the user with a visual indicia or some other prompt as to a location of the parked vehicle relative to the location of the wireless device. The system is equally useful for someone who has forgotten where they parked or for someone attempting to locate the vehicle and who may not have originally parked the vehicle. For example, this system is useful in vehicle sharing, vehicle renting or other such situations, where the person trying to find the vehicle may not have parked the vehicle.

In one particular example, the wireless device obtains the location of the vehicle by receiving information indicative of the location of the vehicle at the time of parking. For example, the vehicle or the device may use GPS and other mechanisms to track the route of the vehicle while traveling to a parking location. The location of the vehicle can be determined using a combination of attributes and other location information stored within a database gathered during vehicle transit. The location information can be a combination of coordinate information gathered through GPS signals, triangulation, and/or other localization processes. The location information can also contain information gathered through sensors and/or accelerometers as part of the mobile device, the vehicle, some combination thereof, or otherwise. Vehicle odometry, steering angles, inertial measurements, etc., can be used to estimate the location of the vehicle in the absence of GPS or other external localization aids. The accelerometers can determine elevation and angular inclines traveled by the vehicle. For example, the angular inclines can include ramps traveled as a vehicle moves up floors in a parking garage. The sensors can include audio and video sensors that can detect environmental attributes. In general, any type of sensor can be used that can obtain information regarding the present conditions of the environment, the type of environment, and the location of attributes in the environment that can be used to help locate the vehicle. For example, the sensors can include a camera, lidar, or other imaging device that obtains images during transit or at the time of parking. The images may be processed to recognize known features that can be associated with a location and/or the route traveled by the vehicle. Thus, although many variations of locating a vehicle may exist, the type and manner in which the vehicle is found can vary based on the route taken by a user and location of the vehicle, as well as the location information available before, during and/or after parking the vehicle.

FIG. 1 is a diagram illustrating a multi-level parking structure, which will at times be referenced herein to help illustrate and explain aspects of the present disclosure. Oftentimes, as drivers are going to a large residential building, a commercial building, an event, or a large attraction, a structure, similar to parking structure 100, is the type of structure available to park their vehicle and where GPS by itself may be inadequate to accurately determine the vehicle's parking location within the structure and/or guide someone back to the location. Often, for example, GPS signals are lost when a vehicle goes inside the structure.

The parking structure 100 can include various floors (or levels) 102a-102n of varying possible sizes. The floors 102a-102n may be underground or above ground and can include parking spots that accommodate various types of vehicles 108a-n such as automobiles, bicycles, motorcycles, trucks, etc. A parked vehicle 104 can be located on one of the various floors including floor 102b. A user 106, with a wireless device 110, in search of their parked vehicle 104 can be located on a different floor 102a than the floor the parked vehicle 104 is located on.

The wireless device 110, used to guide the user 106 to the parked vehicle 104, can include a smartphone with wireless functionality. The wireless device 110 can include, but is not limited to a smartphone, tablet, laptop, and the like. The wireless device 110 can also include wearable electronic devices such as watches, glasses, or wrist bands, and other similar items. Further, the wireless device 110 may communicate with other wired and/or wireless devices including the parked vehicle 104. In the communication between the parked vehicle 104 and the wireless device 110, the parked vehicle 104 or systems associated with the parked vehicle 104 can provide the wireless device 110 with location information. The location information can be collected by the vehicle during transit and can be received, retrieved or otherwise obtained by the wireless device 110 for locating the parked vehicle 104 at a later time. For example, a user attending a sporting attraction can use the location information to locate the parked vehicle 104 at the conclusion of the sporting event.

Figure 2:
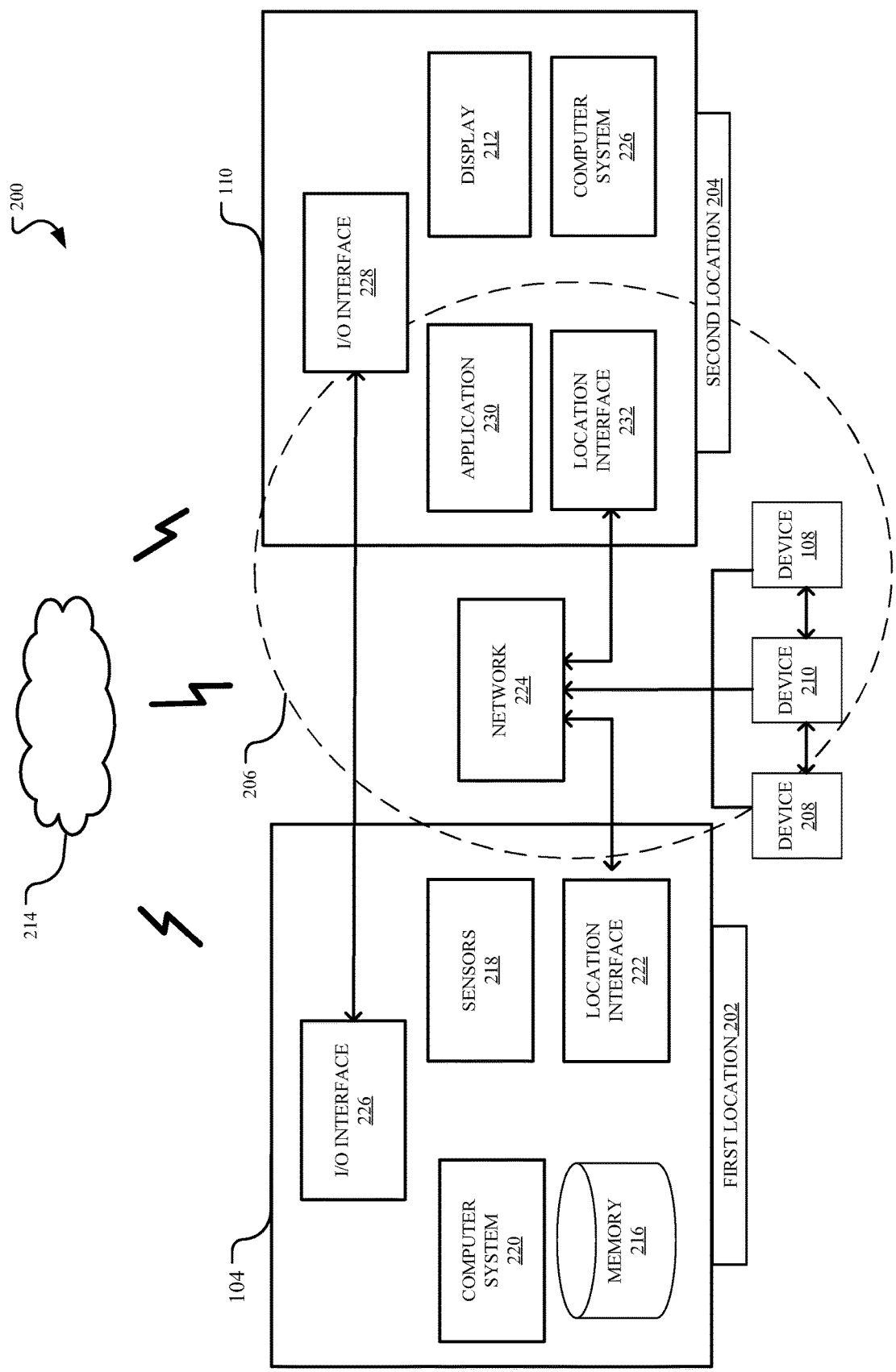
FIG. 2 is a diagram illustrating a system for locating a vehicle.

FIG. 2 is a system diagram 200 illustrating the various components that may be used in a method for locating a vehicle. In FIG. 2, the parked vehicle (e.g., the device 104) is located at a first location 202. The first location 202 can be determined using a computer system 220 and/or other processors, or hardware units. The first location 202 corresponds to the location of the parked vehicle 104. The first location 202 can be determined using a series of methods, algorithms and systems in conjunction with the computer system 220.

In one embodiment, the parked vehicle 104 is located in a location where GPS signals are available. Using GPS location services the location of the parked vehicle can be recognized (by the computer system 220) and retrieved or otherwise be provided by the wireless device 110. Additionally or alternatively, the wireless device 110 can directly receive the GPS signals used to identify location information (e.g., first location 202) of the parked vehicle 104. In some instances, where the GPS location information is not available at the wireless device 110, the first location 202 information can be obtained via transfer from the parked vehicle 104 to the wireless device 110 via an I/O interface 226. The data transfer can occur using a USB connection, an analog connection, a Bluetooth® connection, cellular and/or other wireless connection, or by physically docking the wireless device 110 with a port of the parked vehicle 104. As a result, the wireless device 110 receives access to the first location 202.

In some instances, data transfer can include personal data. Users can benefit from use of data transfer. For example, the personal data can be used to help locate the parked vehicle. Accordingly, use of such personal data enables users to influence and control delivered content.

Users can selectively block use of, or access to, personal data. A system incorporating some or all of the technologies described herein can include hardware and/or software that prevents or blocks access to such personal data. For example, the system can allow users to "opt in" or "opt out" of participation in the collection of personal data or portions thereof. Also, users can select not to provide location information, or permit provision of general location information (e.g., a geographic region or zone), but not precise location information.

Entities responsible for the collection, analysis, disclosure, transfer, storage, or other use of such personal data should comply with established privacy policies and/or practices. Such entities should safeguard and secure access to such personal data and ensure that others with access to the personal data also comply. Such entities should implement privacy policies and practices that meet or exceed industry or governmental requirements for maintaining the privacy and security of personal data. For example, an entity should collect users' personal data for legitimate and reasonable uses, and not share or sell the data outside of those legitimate uses. Such collection should occur only after receiving the users' informed consent. Furthermore, third parties can evaluate these entities to certify their adherence to established privacy policies and practices.

In another example, the parked vehicle 104 is located in a location where GPS signals are not available. In one example, WiFi and/or cellular services are available. In instances where WiFi and cellular services are available, methods such as triangulation, trilateration, and other such multilateration location processes can be used to obtain the first location 202. Triangulation can occur between devices located within a geofence 206. Triangulation and/or trilateration can occur between wearable devices 208, cellular towers 210, access points, wireless devices 110, vehicles 108 (even the parked vehicle 104), etc. For example, the parked vehicle 104 can be located in a lot with cellular network access. Using cellular triangulation methods, the vehicle's location can be determined. The first cell tower can provide sector wide granularity, the second cell tower narrows the location based on the intersection of the swept areas of the two towers. A third cell tower then narrows the location further based on the intersection between the swept areas of the three towers. Further details explaining these trigonometric navigation processes will be described below and in conjunction with FIGS. 6A-6B.

In another example, the location of the parked vehicle 104 can be found using WiFi via the measured signal strength of surrounding routers or the time of flight for the signal to travel between the surrounding routers and the parked vehicle 104. The parked vehicle 104 can identify its location using the signal strength or Received Signal Strength Indication (RSSI) of the routers or the time of flight for the signal to travel between the surrounding routers and the parked vehicle 104. Details regarding the use of RSSI for location detection will not be included as the use of RSSI is commonly known in the art and generally associated with the nearest neighbor, and Markov localization methods.

Still in another example, a mesh antenna network can be used to locate the parked vehicle 104. In this instance, GPS localization can be used until the signal is no longer reliable or not available. If this occurs, localization can continue or is exclusively found using signals arriving from at least two antennas from various wireless networks. The signals from the various antennas work jointly as they interconnect to provide an accurate location of the vehicle. For example, the vehicle can use a cellular signal to obtain location information. As the signal strength lessens, the vehicle 104 can connect with a Wireless Local Area Network (WLAN) to obtain location information using the RSSI of a nearby router. This interconnectivity can continue as the vehicle is en route to its final parking location, e.g., the first location 202. The interconnectivity can occur over various wired and/or wireless networks including WLAN, Bluetooth®, 3GPP cellular, WiMax, GPS, UWB, etc. The signals can be transmitted by antennas on devices ranging from wearable devices, wireless devices, beacons, routers, satellites, radio-frequency identification (RFID) devices, and even other vehicles. The communication can occur over the network 224 via a location interface 222.

In yet another alternative, the parked vehicle 104 can be located in an enclosed parking structure where GPS, WiFi, and cellular can be available but can be limited. In such an instance, a combination of wireless signals, radio frequency (RF) parametric data, images, and the like can be used for detecting the location of the parked vehicle 104. As indicated above, while a GPS signal is available, the vehicle can obtain location information, however as the signal is diminished, the vehicle 104 can transition to using a mesh antenna network for location detection. In addition, sensors 218 including accelerometers, gyroscopes, compasses, Inertial Measurement Units (IMUs), etc., located within the vehicle and/or the device can be used for location detection. Sensors 218 located within the vehicle can gather and store information in a memory 216 which may be some form of memory onboard the vehicle 104, in the wireless device 110, or a combination thereof. The information stored in the memory 216 may be stored in a database and may include information associated with speed, angular incline, wheel revolutions between change in direction, and direction. Sensors 218 can also record and store audio and video attributes of the environment. The sensors 218 can include cameras that capture images of the areas passed on the way to the parking location. Distinguishing features found within the images can then be used for identifying the first location 202. These images can be stored in the memory 216 and processed for location identification. In addition, the distinguishing features can also include geocodes and markers that are pre-existing in the memory 216, and indexed in the memory 216 as image 508 of FIG. 5. These known markers can be used in conjunction with the sensors 218, such as the accelerometers, etc., to track the direction of the vehicle from the markers. The markers can include known features, codes, symbols, etc., which are stored in the memory 216 and can be associated with a location (e.g., coordinates). Further, the markers, codes, symbols, and other images can be captured by the sensors 218 or other devices including mobile phones, tablets, laptops, wearables, and other vehicles. Additionally, visual mapping of the garage can be available and stored in a networked storage 214 accessible to the parked vehicle 104 and/or the wireless device 110. For example, an imaging device and/or other processing element may recognize a sign indicating a floor level of the garage or the entrance to the garage. Therefore, when a GPS signal is unavailable, other data and information can be used to track the parking location, such as location information nearest to the parking location and image recognition associated with a known location.

Note that additional processes and components can be used for locating a parked vehicle 104. These processes can include, but are not limited to the use of, location software, other indoor positioning systems, dead reckoning methods, Simultaneous Localization and Mapping (SLAM)/Grid Concepts/Angles of Arrival (AoA) location detection algorithms, and heat mapping. Indoor positioning systems can include solutions that use radio waves, acoustic signals, magnetic fields, and other information collected by the vehicle and/or wireless device to determine a location. Indoor positioning systems can even use dead reckoning methods to determine location. Dead reckoning is a navigation method used to determine location based on a previously determined position. The method works by taking a previously known location and adding the change that has occurred in a given time interval to obtain a new location.

The update of the new location forms what may be referred to as path integration. SLAM is a localization method that also uses the construction and update of an unknown environment to reconstruct a trajectory. SLAM can be used to enhance localization in areas with reduced GPS mapping capabilities.

In addition, the determination of a location of a vehicle can also extend to interconnectivity between vehicles. In other words, a vehicle may determine its location by communicating with other vehicles. For example, an antenna of a parked vehicle 104 can be used in triangulation and/or trilateration if within proximity. For instance, if the parked vehicle 104 is located within geofence 206 and identified, then if present, triangulation and/or trilateration can be performed between the wireless device 110, the parked vehicle 104 and another device. In another example, the antennas from vehicles in proximity to wireless device 110 can be used to triangulate and provide location (e.g., RSSI) details to the wireless device 110. For instance, if the parked vehicle 104 is located outside the geofence 206, then the wireless device can triangulate with other devices 208, 210, 108 as mentioned above. The other devices 208, 210, 108 can include other vehicles within the vicinity of the wireless device 110 that have emitting antennas. Additionally or alternatively, if the parked vehicle 104 is within the geofence 206, then the parked vehicle 104 can be used in conjunction with other vehicles 108 to provide location information over a network 224 via location interface 222. Still in another example, vehicles 108 can communicate with each other by transmitting location information between each other wirelessly and/or with other devices (such as the wireless device 110 and/or devices 208, 210) over a network 224. The location information can include already predetermined coordinates of the vehicle as obtained during transit using a similar process as described above. For instance, if vehicles in the vicinity were already located and have access to location information, the location of the vehicle can be used for determining the location of the parked vehicle 104. Further, the parked vehicle 104 can communicate its known location with other parked vehicles to provide location information details. Therefore, parked vehicles or vehicles in transit containing accurate localization systems could be used to provide reference or anchor points for the localization of vehicles passing by.

Therefore, these sensors, processes, etc., are used and the first location 202 is determined and retrieved by the wireless device 110. Next, to provide the user 106 of the wireless device 110 with directions to the parked vehicle 104, the current location (e.g., second location 204) of the wireless device 110 may be determined. As was the case with determining the first location 202, any and all of the methods described herein can be used to determine the location of the wireless device 110. In determining the current location of the wireless device 110, triangulation may be performed by using the wireless mesh (e.g., mesh antenna network) described, which may be useful as various antenna sources can be used and are usually available. For example, a nearby cell tower 210, a wearable device 208, and even vehicles can be used in triangulating with the wireless device 110 using the network 224 via the location interface 232. Devices within the geofence 206 can be used to determine the wireless device location. Again, further details describing the triangulation process will be described below and in conjunction with FIGS. 6A-6B. As the triangulation process is completed, a second location 204 can be determined which can then be used to determine (using computer system 226) a route and/or direction from the wireless device 110 to the parked vehicle 104. Additionally or alternatively, similar to the processes involved in determining the location of the parked vehicle, the wireless device 110 can also use other methods and processes to determine a location. For example, the camera located on the wireless device 110 can be used to capture and recognize a feature, a marker, a Quick Response (QR) code, etc., in order to determine the location of the wireless device (e.g., second location 204). As an example, the camera of the wireless device 110 may determine a location associated with where a particular photograph is captured and store this information as metadata associated with the photograph. In addition, in instances where GPS location is not available and/or odometry reading, wheel sensing, etc. for location estimation is not available, range, bearing and barometric information can be used instead. In this instance, the parked vehicle 104 can transmit the range and bearing information to the wireless device 110 which can be used in conjunction with an internal compass in the wireless device 110 for location determination by the wireless device 110. Range and bearing methods are commonly used in vehicular transit and will not be explained. Barometric measurements are measurements of the pressure exerted by the weight of air in the atmosphere. The barometric measurements in the parked vehicle 104 can be compared to the barometric pressure measurements in the wireless device 110 to determine altitude differences and provide guidance as to possible elevation and level differences between the parked vehicle and the wireless device 110. The barometric, range, and bearing information can be transferred between the parked vehicle 104 and the wireless device 110 by connecting the wireless device 110 with the parked vehicle, via cellular or WiFi networks, or another type of network or connection.

The wireless device 110 and the parked vehicle 104 may determine the route and/or a direction between the location of the wireless device 110 and the location of the parked vehicle 104 using processes and algorithms executed by the wireless device 110. Various routing algorithms exist and are known in the art. For example, these algorithms can include the Euclidean algorithm, the Bellman-Ford algorithm, the triangle inequality algorithm, etc. Once the route(s) are determined, the route, alternative paths and time estimates can be determined and presented via an application 230 to the user 106 of the wireless device 110 using a display 212 that provides a graphical user interface (GUI). In addition to or alternatively, the display 212 can provide on the GUI directional operators such as an arrow and/or text for the user 106 to follow to arrive at the parked vehicle 104 located at the first location 202.

Figure 3:
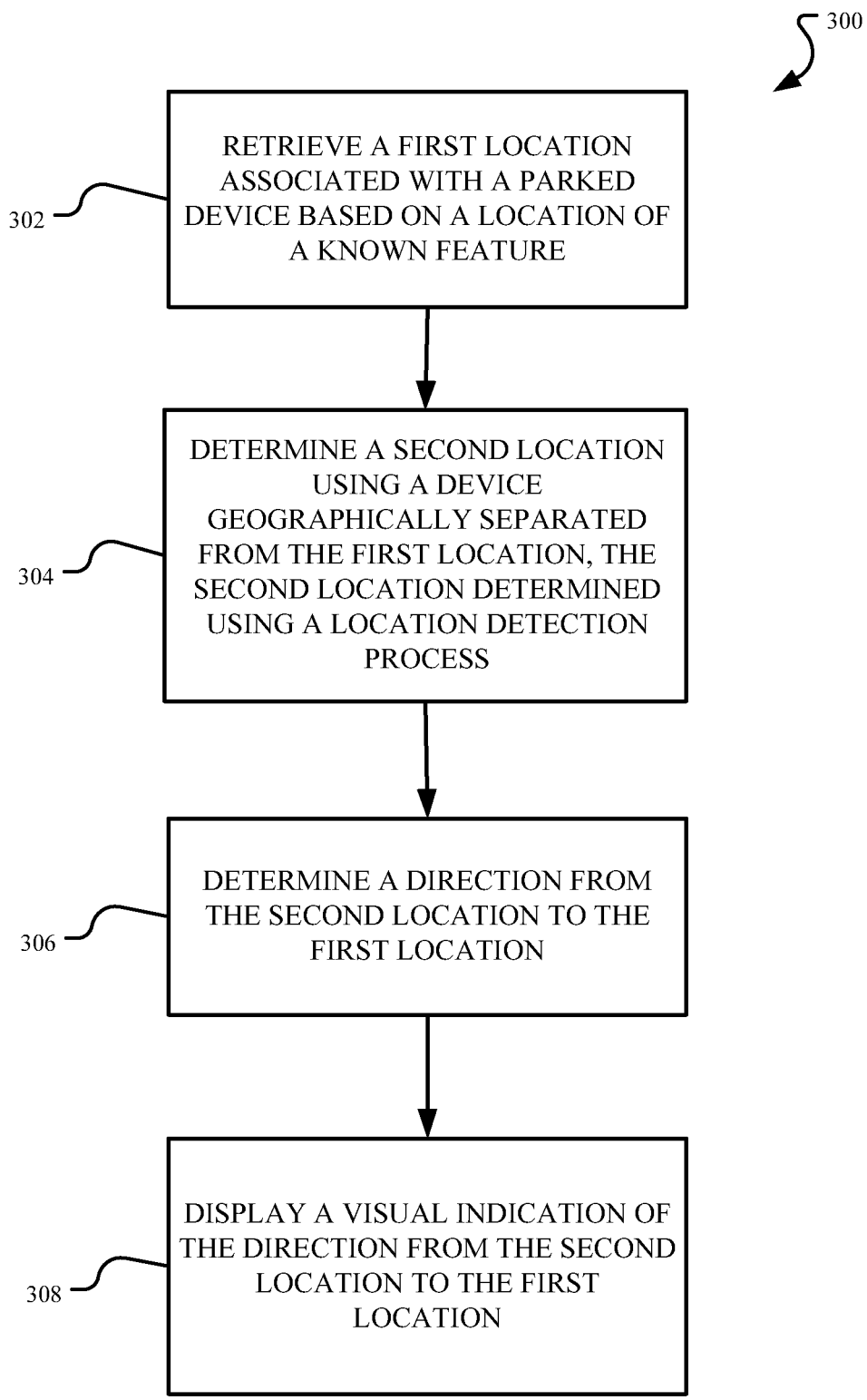
FIG. 3 is a flowchart of a method for locating a vehicle.

FIG. 3 corresponds to a flowchart providing a process used by the system 200 for locating the parked vehicle 104. The flowchart represents the operations of a process 300 for locating a vehicle or other device, parked in a large multi-level parking garage such as the one illustrated in FIG. 1. The method 300 can apply to locating other devices and is not limited to vehicles. In addition, the location of the parked vehicle 104 is not limited to large structures and the system 200 and the method 300 may be used to locate the parked vehicle 104 in a large lot, in a distant street, along a street between large buildings, and in other locations.

The process 300 may be implemented by an application 230 executed by the wireless device 110, and may be implemented through computer executable instructions stored in non-transitory and/or transitory storage on or associated with the wireless device 110. The method 300 may be called when an already parked vehicle 104 is being located. In one instance, the user 106 is locating the parked vehicle 104 using an application on the wireless device 110. The method 300 begins by performing operation 302. In the operation 302, the wireless device 110 obtains or retrieves the location of the parked vehicle 104. In this operation, the vehicle 104, while en route to the parking location, obtains information that can be used to associate the parked vehicle with the first location 202. The final vehicle destination (e.g., first location 202) and/or attributes thereof can be stored in the memory 216 or repository that can be retrieved or accessed by the wireless device 110. The information can be retrieved by the wireless device 110 using a wireless network (e.g., WLAN, cellular, Bluetooth®, etc.), by docking wireless device 110 with the vehicle 104, through a USB port, connecting the wireless device with the vehicle using another type of port, or obtained in another way. In one example, the information may be obtained from the network storage 214, from an external device such as a wearable device that can communicate with the parked vehicle 104 and the wireless device 110, or may be manually input by the user 106. In one example, the vehicle location information is transmitted from the parked vehicle 104 to the wireless device 110 and stored locally on the wireless device 110. Such transmission may occur automatically when the parked vehicle 104 is turned off after being parked, may occur based on proximity between the wireless device 110 and the parked vehicle 104 (the device automatically detects movement away from the parked vehicle 104), may occur based on a request from the wireless device 110, or otherwise. In one example, the wireless device 110 may be used to track a vehicle to a parked vehicle location using GPS hardware, accelerometers, and other sensors associated with the wireless device. In some instances, the wireless device 110 may be electronically connected to the parked vehicle during operation and receive or otherwise participate in vehicle location tracking.

Once the wireless device 110 has obtained the location information in operation 302, the process 300 continues to operation 304, where the wireless device 110 proceeds to determine its own location. The wireless device 110 may obtain its location in a number of ways.

In one example, the wireless device 110 may obtain its own location through indoor navigation techniques by taking advantage of integrated wireless networks. These wireless networks can include or be based on WiFi, Bluetooth®, Bluetooth Low Energy Beacons, Near-Field Communications (NFC), cellular, Wireless Local Area Networks, ultra-wide band (UWB), etc. The networks can work collectively to create a mesh antenna network. In the mesh antenna network, interconnectivity between the networks exists such that, if a signal is low or unreliable, an alternate network can be used to obtain location information. Devices can be connected to networks and can transmit at various signal strengths.

The signal strengths of the transmitting devices can be measured and used to gauge a distance from the wireless device 110. The locating process can generally indicate that a transmitting device with a higher signal strength can be located at a closer distance to the wireless device 110 than one with a lower signal strength and/or threshold. Additionally, the signals received at the wireless device 110 from the transmitting devices, and the round-trip signal time can be used to determine the location of the wireless device 110. For example, trigonometric identities, such as triangulation and trilateration, can be used to determine the location of the wireless device 110. Further details describing triangulation and trilateration are included below. Additionally, or alternatively, when the wireless device 110 is outside of a building or structure or otherwise can receive GPS signals, GPS location can be used to determine or supplement the location of the wireless device 110.

By retrieving the final destination of the parked vehicle 104 and the current location of the wireless device 110, a beginning point and an end point are determined. The first location 202 and the second location 204 or end points, are used to determine a route or direction from current location of the wireless device 110 to the vehicle location in operation 306. In this operation, the wireless device 110 can be used to determine the shortest route to the desired location, e.g., the location of the parked vehicle 104. The algorithms used to determine the route may be associated with and/or executed by a processing module of the wireless device 110 including the application 230.

Once a route is determined at operation 306, the process 300 continues in operation 308. At operation 308, the route is presented to the user 106 via a visual display on the wireless device 110. In some instances, a route in conjunction with a direction can be presented to the user 106 via the GUI displayed on the display 212 on the wireless device 110. The GUI may include a series of images, texts, arrows, symbols, numbers, etc., indicating the direction to follow. For example, when mapping data is available, the user 106 may be routed to the parked vehicle 104. However, if the mapping data is lost, then the user is provided with directional prompts such as the arrows, symbols, etc. Still in other instances, directional prompts may be presented without a route. The user 106 carrying wireless device 110, located in an area (e.g., parking structure 100) without mapping information can be guided to the parked vehicle 104 using directional prompts such as north, south, straight, up, down, etc., provided by the GUI displayed on the display 212 of the wireless device 110. In other words, the wireless device 110 may provide the user 106 with realtime turn-by-turn walking directions from their current position to the vehicle 104.

The vehicle 106 and/or the wireless device 110 may determine the first location obtained at the first time instance based on first location information of the vehicle when the vehicle loses a Global Positioning System (GPS) signal. This first location information may reflect a location where the vehicle enters the parking structure 100, e.g., latitude x, longitude y. In addition, the first location may be based on second location information associated with travel of the vehicle from when the vehicle loses the GPS signal to when the vehicle parks. This second location information may be determined by the sensors of the vehicle 106 and/or the sensors of the wireless device 110 and may indicate how far the vehicle travels after the vehicle enters the parking structure 100. The first location may also be based on third location information of the vehicle associated with a known feature in an image captured by the vehicle 106 and/or the wireless device 110. The image may be captured by the vehicle 106 one of (1) when the vehicle parks and (2) after the vehicle loses the GPS signal and before the vehicle parks. As an example, the known feature may be a sign that shows a current floor.

The first location also may be based on fourth location information of the vehicle 106 based on a distance from when the vehicle 106 and/or the wireless device 110 loses the GPS signal to when the vehicle parks, e.g., 1500 feet, fifth location information of the vehicle 106 based on an elapsed time from when the vehicle loses the GPS signal to when the vehicle parks, e.g., fifty seconds, and sixth location information of the vehicle 106 based on an elevation change from when the vehicle loses the GPS signal to when the vehicle parks, e.g., 100 feet.

The wireless device 110 may determine a parking structure where the vehicle 106 is parked based on the first location information, determine a level of the parking structure where the vehicle is parked based on the second location information, determine a particular parking spot for the vehicle based on the third location information, and display the visual indication based on the first location information, the second location information, and the third location information. In addition, the wireless device 110 also may determine where the vehicle 106 is parked based on the fourth location information of the vehicle, the fifth location information of the vehicle, and the sixth location information of the vehicle. The wireless device 110 may display the visual indication based on the fourth location information of the vehicle, the fifth location information of the vehicle, and the sixth location information of the vehicle.

The wireless device 110 may display a graphical user interface that shows the visual indication of the direction from the second location that represents a current location of the wireless device 110 and the first location of the vehicle 106. Additionally, more than one wireless device 110 may provide the graphical user interface. The more than one wireless device may simultaneously display a first graphical user interface on a first wireless device such as a smartphone that shows the visual indication of the direction from the second location that represents a current location of the smartphone and the first location of the vehicle and display a second graphical user interface on a second wireless device such as a wearable electronic device that represents a current location of the wearable electronic device and the first location of the vehicle. The second graphical user interface may provide less detail, may be smaller, and/or may be different than the first graphical user interface.

Figure 4:
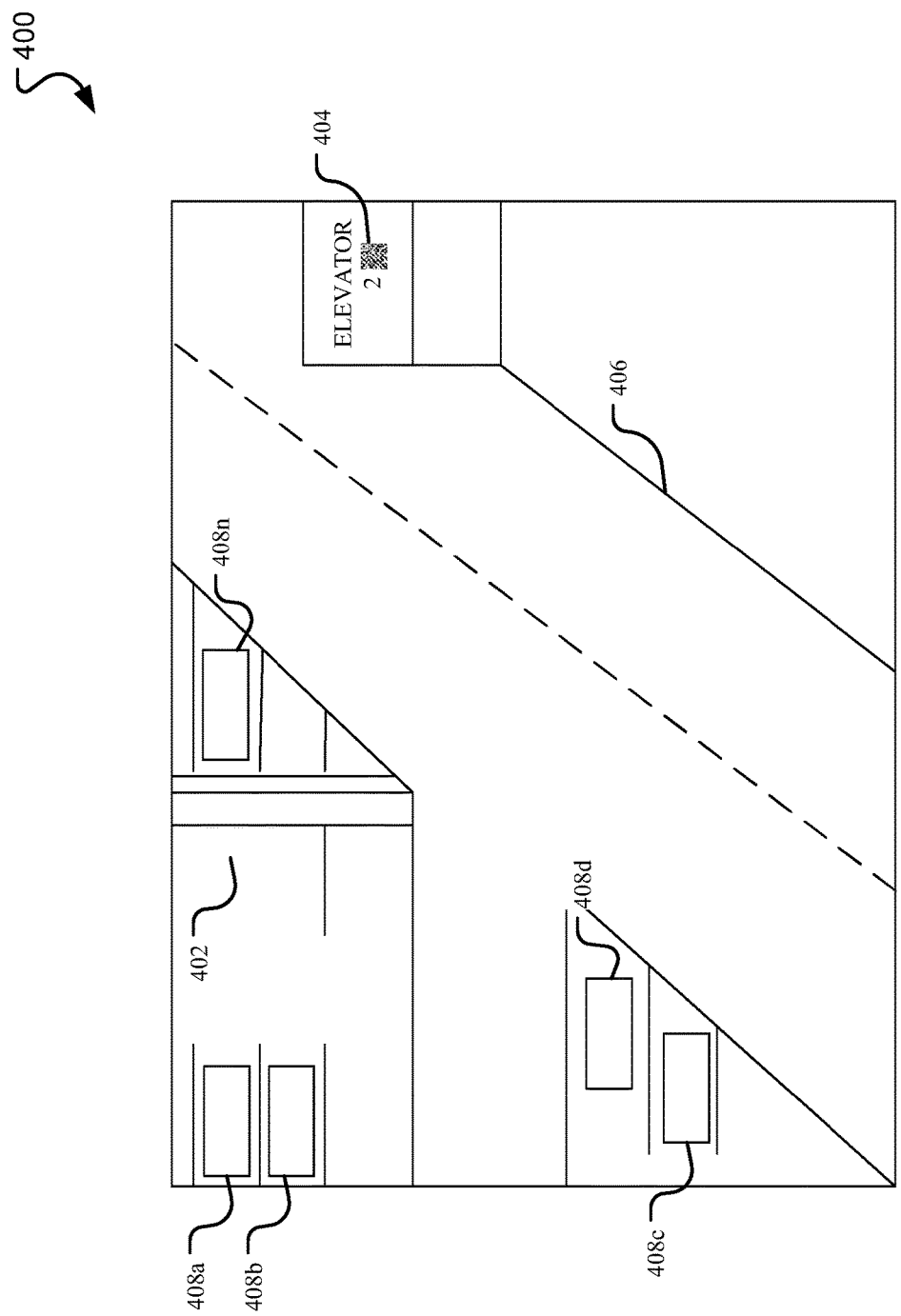
FIG. 4 is a diagram illustrating an image containing an exemplary feature associated with a location.

FIG. 4 provides a diagram illustrating an image 400 containing an exemplary feature or marker 404 associated with a location. As mentioned above, the sensors 218 can be used to aid in determining the first location 202. The sensors 218 can include cameras located within or on the vehicle 104 that can take images 400 of the environment. The camera sensors can be located on the vehicle roof, hood, sides, bumpers, on the under-side, inside the vehicle, etc. The images 400 can be stored in the memory 216, a database, repository, the networked storage 214, a server, etc., that can be accessed for location detection as described above and in conjunction with system 200 shown in FIG. 2.

In one embodiment, the exemplary feature can include a visual marking or sign, an audible marking, or another type of marking indicating a level in a garage, similar to the multi-level parking garage 100 shown in FIG. 1. Image 400 of FIG. 4 presents a view with the visual marking similar to that encountered when a vehicle is driving through the garage. This marking can be photographed or recorded and stored for later retrieval and/or for determining the final parking location of the vehicle. The vehicle, in search for a parking location 402 can travel up a ramp 406 and pass numerous objects including elevators, other vehicles 408a-408n, markers 404, etc. In one example, a marker 404 (e.g., an elevator, a sign (4$^{th}$ Floor), a QR code) is recognized and captured by the camera sensors or other sensors on the vehicle and used to determine that the vehicle has passed the feature 404 en route to the first location 202. From the feature 404, the vehicle can use the other location processes described above including the mesh antenna network, SLAM, dead-reckoning, triangulation, etc., to identify its final location. In one instance, the vehicle can determine its final parking destination by recording that the vehicle has passed marker 404 and after that marker 404 the vehicle moved x wheel rotations, the vehicle went up n inclines, and the vehicle made y turns to its final destination after recognition of the marker. In another instance, after recognition of the marker 404, the vehicle encounters another marker 404 which it tracks and archives to compute its final destination. Still in another instance, upon encountering the marker 404, the vehicle retrieves the location mapping of the garage to route itself from the marker 404 to its first location 202. In some instances where markers 404, images, photographs, mapping, geocodes, QR codes etc., exist throughout the garage, the markers 404, images, photographs, mapping, QR codes, etc., can be used as the sole locator of the parked vehicle 104 as the marker can be associated with a specific location and/or coordinates. For example, if the parked vehicle 104 is parked right next to a QR code having encoded coordinates, then the code may be sufficient for determining the first location 202. Using image processing, the vehicle can store markers, visual mapping, images photographed by the vehicle camera sensors, and the like, to track the transit between the possible loss of signaling (e.g., when the GPS signal diminished) to the location where the vehicle is parked.

In yet another embodiment, the images can be used in conjunction with previously uploaded images to determine the first location 202. For example, the user 106 may be in a parking lot that was previously traversed and mapped by another vehicle 408. Via crowdsourcing, the user 106 may be able to use the combination of images taken and the images uploaded by the other vehicle to determine the first location 202 using prediction analysis. Prediction analysis is a technique used to make predictions about future or unknown events. Using statistical analysis, modeling, machine learning or other data mining process, predictions can be made using current and historical known data.

Various embodiments described herein, as well as combinations thereof, provide mechanisms for collecting data for locating a parked vehicle 104. The systems set out herein provide a solution that enables a user 106 with a wireless device 110 to locate a parked vehicle 104. The method 300 is described above and in conjunction with FIG. 3. As indicated above and in conjunction with FIG. 4, a vehicle can rely on numerous resources to determine the first location 202. The resources can include GPS signaling, mesh antenna networks, triangulation and data collection and/or retrieval. The data collection and/or retrieval can be obtained from varying sources and sensors including, but not limited to, accelerometers, compasses, gyroscopes, sensors, and various signaling processes. The data collected can be stored in networked storage, a remote server, in memory, and/or a database as illustrated in FIG. 5.

A database table 500 provides an exemplary embodiment of location data and may be used to identify or compute a first (parking) location 202 and types of data that can be used to store the various location parameters. The various location parameters captured by the numerous sensors, accelerometers, etc., may be alone, in some circumstances, or collectively used to track a vehicle to a parking location and identify that location. In one example, the location information is organized by time stamp and stored in a time location column 502 of the database table 500. The time stamp can be used as a base time, such that direction, distance, images, elevation and other information may be tracked from that base time. In some instances, the data may be obtained on a running basis, in other instances the data may be recorded or marked in association with some external event. A second column of the database table 500 may store coordinates information 504. A third column of the database table 506 may store GPS information 506. For example, the GPS information may be stored when a GPS signal is lost (such as might occur when entering a garage, or the GPS information may be stored or marked when the system recognizes some particular image such as a sign designating the entrance to a particular garage).

Direction information 508 may be stored in another column of the database table 500. Distance information 510 may be stored in another column of the database table 500. Image information 512 may be stored in another column of the database table 500. Elevation information 514 may be stored in another column of the database table 500. Speed information 516 may be stored in another column of the database table 500. For example, the direction information 508 may be gathered by the vehicle regarding the direction (e.g., north) the vehicle was traveling at any particular time. Similarly, the speed at that time may also be recorded. An electronic compass, wheel sensors—which measure speed, and accelerometers—which measure the specific force (e.g., the time rate of change in velocity), can be used to determine and store the direction information 508 and the speed information 516. In addition to the speed information 516, when traveling in a given direction, a corresponding distance parameter can be stored in the appropriate column of the database table 500. For example, if the vehicle traveled at 10 mph north before making a left, the direction information 508, speed information 516 and distance information 510 may be determined and stored in the database table 500. Consequently, as the vehicle is traveling to its parking destination, sensors may capture images of the environment. One such example is the image that was illustrated in FIG. 4. Again, the direction information 508, distance information 510, and image information 512 may be stored within the database table 500 of FIG. 5.

Other parameters such as the elevation information 514 (e.g., in instances when traveling up a ramp), coordinates information 504 (e.g., latitude and longitudinal coordinates obtained from the wireless mesh and/or GPS information 506, triangulation), and addresses, etc. can be stored in the database table 500. The coordinates obtained from the wireless mesh can be determined using known methods like triangulation, trilateration, and other similar location methods.

For example, vehicle 104 may enter a multi-level parking structure 100 with a GPS signal demonstrating latitude and longitude coordinates (i.e., 39° 44.349'N, 104° 29.082'W). As the vehicle moves within 5 seconds from the entrance of the multi-level parking structure 100, the GPS signal is lost (e.g., 0—Null value) and an image/marker is recognized. The marker is a pre-existing QR Code previously stored and designated QR Code and stored as image information 512, indicating the garage level. Alternatively, image recognition can be used as an image in a repository is identified by the camera sensors and captured for use in determining the final location of the vehicle. The vehicle 104 continues traveling north at a speed of 5 mph and at 8 seconds from the entrance encounters an incline of 100 ft for a distance of 150 ft. The vehicle 104 is located at the x2, y2 coordinates traveling at 5 mph when encountering the ramp. The vehicle 104 then continues north for 100 ft when it encounters a second marker, designated marker 003. The vehicle 104 stores and identifies the second marker as corresponding to coordinates x2, y3. Two seconds from the last marker the vehicle turns east and enters a parking spot at x3, y3. These set of directions can then be used to obtain the location of the parked vehicle (e.g., first location 202). This first location 202, as previously indicated, is then retrieved by the wireless device 110 for later use in locating the parked vehicle 104.

Figure 6A:
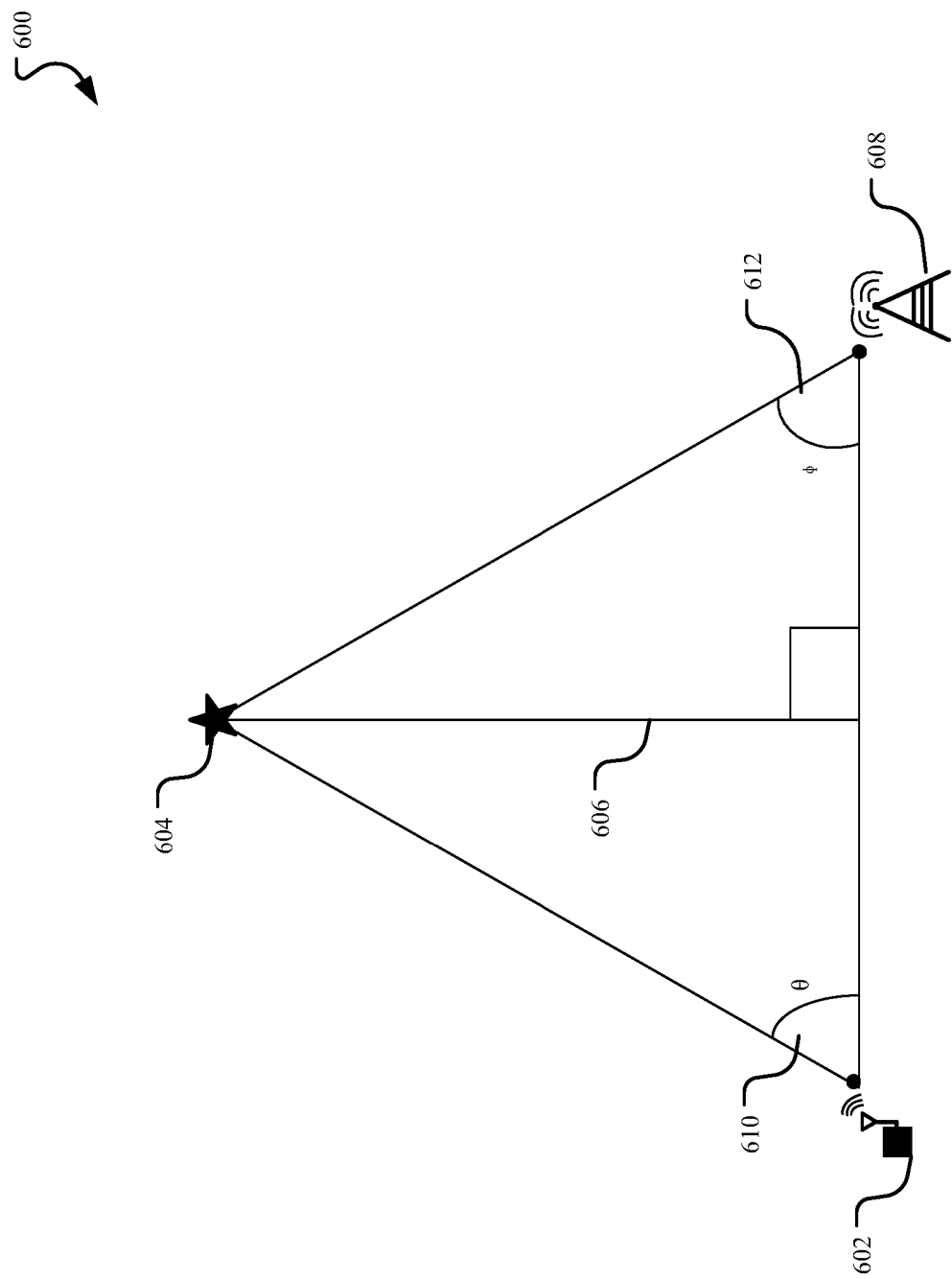
FIG. 6A is a diagram illustrating a triangulation method used for determining the location of an object.

FIG. 6A is a diagram illustrating a triangulation method used in determining the coordinates of a device 604 (e.g., location of parked vehicle 104). Triangulation is a method that determines a location of an object by taking into account the placement of two or more antennas 602, 608. In the current embodiment, the object to be located 604 (e.g., parked vehicle 104) can be identified by using the steering angles of the two antennas 602, 608. The antennas can determine the coordinates from other wireless devices, access points (APs), cellular towers, vehicles, etc. Beam steering is a concept that is known in the art that uses beamforming algorithms to steer an antenna's beam in a desired direction. Using beam steering, a first steering angle θ 610 can be determined from the beam direction of the antenna 602. Similarly, a second steering angle Φ 612 can be determined from the direction of the second antenna 608. Then, using the angular information, the first steering angle θ 610, and the second steering angle Φ 612, the opposite and adjacent sides of the triangle 600 can be determined. Once the sides of the triangle 600 are known, the location of the device 604 can be determined. In other words, if the angles 610, 612 of the antennas 602, 608 are known, the distance between the two antennas can be determined. Once the distance between the two antennas is known, using the law of sines, it is possible to determine the coordinates of the device 604 and the distance 606 to the device 604. Thus, the location of the parked vehicle 104 can be obtained using the steering angles of two nearby devices.

Figure 6B:
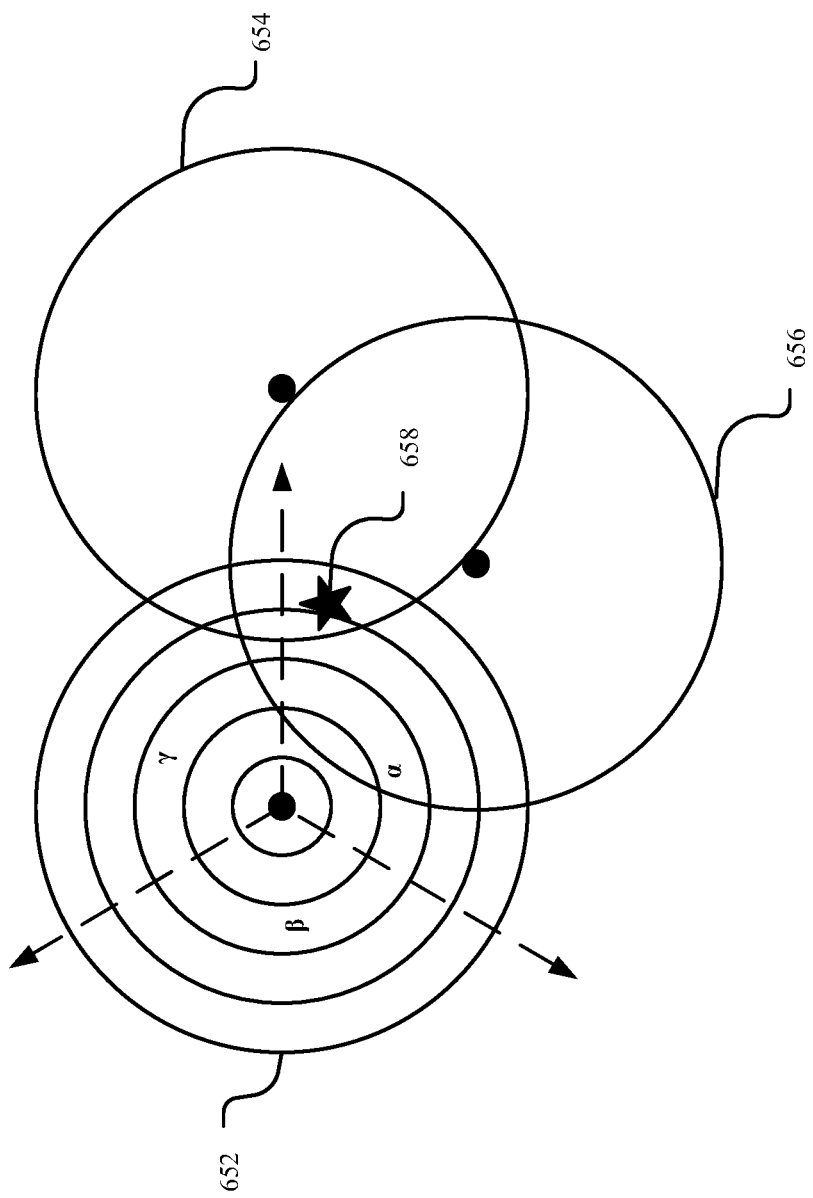
FIG. 6B is a diagram illustrating a trilateration method used for determining the location of an object.

FIG. 6B is a diagram illustrating a second exemplary method for determining the location of an object. In FIG. 6B the concept of trilateration is illustrated. Note, in trilateration, geometry is used, differing from the triangulation method of FIG. 6A which uses angle measurements. The use of trilateration is often used in GPS, surveying, cellular device location, and other applications with location detection. Trilateration can be used to identify a device 658 using the spherical radiation from three antennas 652, 654, 656. Various techniques for solving a trilateration problem exist, however two basic methods are explained here.

The first method solves for the location of device 658, by determining the intersection of the three spheres 652, 656, and 654. The intersection of the three spheres can be determined by formulating three equations and solving for three unknowns. Solving for the intersection (e.g., location of device 658) begins by centering the three spheres 652, 656, 654 on the z-plane and formulating initial equations based on their location. Next, the series of equations are manipulated such that the first antenna 652 is centered at the origin (e.g., {0, 0, 0}) and the second antenna 654 is centered about the x-axis. Then, using the radii of the spheres, the series of equations are solved, and the location of the intersection, e.g., the device 658, is determined. Once the location of the intersection, e.g., the device 658, is determined, the location of the intersection is adjusted to account for any adjustments made to the spheres in centering antennas 652 and 654. The final coordinates after any necessary adjustments provide the location of device 658.

The second method is often used in cellular communications. In this method, a first sphere 652 (antenna radiation) from a device is divided into sectors α, β, γ. These sectors α, β, and γ represent ⅓ of the sphere and narrow down the location of a device to one of the sectors α, β, and γ, based on signal strength. Once the sector of the device 658 is located and is identified, the intersections of the other two antennas 654 and 656 can be used to narrow down the location of device 658. For example, in FIG. 6B, the device 658 can be identified as located within the a sector. Next, a second antenna 656 can be used to narrow the region down even further. As illustrated in FIG. 6B, the radiation from antenna 656 extends to sector a and γ in antenna 652, however because the device has already been identified as existing within sector a, any overlap extending to sector γ is not considered. Thus, the area where device 658 is located is further minimized. After the area has been minimized, the intersection of the third sphere from the third antenna 654 is determined. This intersection points to a smaller area, where the device 658 is located.

Three or more antennas can be used for this approach, and as more antennas are used, the resolution of the location of the device can improve. Additionally, the antennas can be other sources. The method for device location is not limited to cellular communications. For example, antennas may be routers, mobile devices, wearable devices, laptops, tablets, PDAs, vehicles (including the parked vehicle 104), and the like. Further, determining the location of the user and/or the vehicle is not limited to triangulation or trilateration as discussed, other methods can be used including multilateration, multiangulation, and methods based on the Time/Frequency Difference of Arrival principle.

Figure 7:
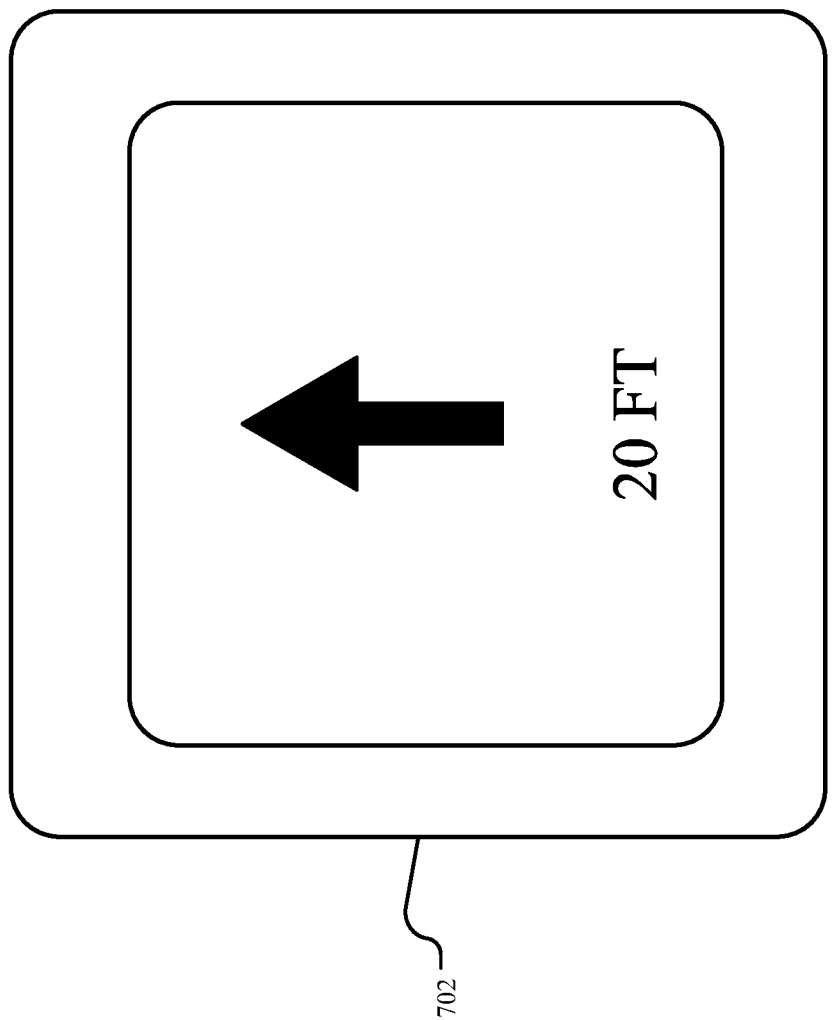
FIG. 7 is a diagram illustrating a visual representation of a direction to take in locating a vehicle.

As discussed above, the first operation in process 300 in locating a parked vehicle 104 includes obtaining the location of the parked car. Next, the location of the wireless device 110 needs to be determined. Once these locations are known, then location algorithms, such as the Euclidean, Bellman-Ford, triangle inequality, etc., can be used to determine the route(s) to the parked vehicle 104. The route can be presented to the user 106 of the wireless device 110 as indicated in operation 308 of FIG. 3 and by the display 212 of system 200 in FIG. 2. The user 106 may then have the option of selecting a route to take if more than one route exists. Once selected, the user 106 will be guided to the location of the vehicle using the wireless device 110. In guiding the user 106 to the parked vehicle 104, the wireless device 110 can provide a visual representation of the direction the user should take, as indicated in operation 308 of method 300 in FIG. 3. FIG. 7 provides an example of a possible graphical user interface that can be presented to the user 106 that illustrates the route to the parked vehicle.

FIG. 7 is a diagram illustrating a visual notification 702 that may be displayed by the display and indicates a direction to take in locating the parked vehicle 104. The visual notification can include a direction and distance to walk, and other directional prompts. The visual notification in FIG. 7A for example presents an arrow in the direction the user 106 is instructed to travel for a distance of 20 feet. In instances where the user may have to travel up in elevation, the visual notification 702 can also include an elevation indicator for the user 106 as a reference. For example, if the user 106 is to travel to the second level where the parked vehicle 104 is located, then the visual notification 702 can provide an arrow that is at a slight tilt, an arrow pointing up to continue, text indicating the elevation to travel, and/or a picture or graphic (e.g., a person climbing), etc. In addition, the visual notification 702 can also provide the distance from the parked vehicle. For example, a second text indicator (e.g., 120') can be included that provides a total distance to the vehicle. In addition, other forms of notification can be provided including but not limited to, audible commands or notifications, haptic notifications, tactile feedback or notifications, and other similar kinesthetic technology.

Figure 8:
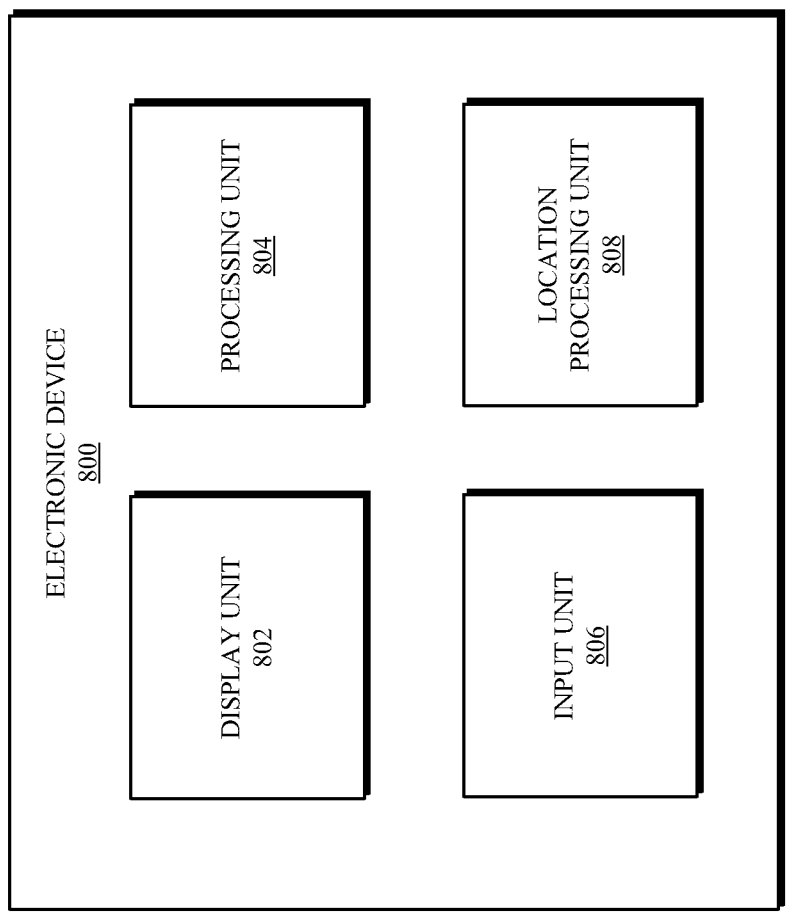
FIG. 8 illustrates a functional block diagram of an electronic device including operational units arranged to perform various operations of the presently disclosed technology.

The vehicle 104 has been described above in relation to the method of locating the parked vehicle. However, in an electronic device, such as a vehicle 104, other system units may be used to operate the vehicle. FIG. 8 provides a description of some of the other system units involved. For example, an electronic device 800 including operational units 802-808 arranged to perform various operations of the presently disclosed technology is shown. The operational units 802-808 of the device 800 are implemented by hardware or a combination of hardware and software to carry out the principles of the present disclosure. It will be understood by persons of skill in the art that the operational units 802-808 described in FIG. 8 may be combined or separated into sub-blocks to implement the principles of the present disclosure. Therefore, the description herein supports any possible combination or separation or further definition of the operational units 802-808.

In one implementation, the electronic device 800 includes a display unit 802 configured to display information, such as a graphical user interface, and a processing unit 804 in communication with the display unit 802 and an input unit 806 configured to receive data from input devices or systems. Various operations described herein may be implemented by the processing unit 804 using data received by the input unit 806 to output information for display using the display unit 802.

Additionally, in one implementation, the electronic device 800 includes a location processing unit 808 implementing the operations described with respect to the system 200 of FIG. 2. The instructions executed by the location processing unit 808 can include determining the location of the parked vehicle 104. The location of the parked vehicle can be determined using sensors of the parked vehicle 104. The location of the parked vehicle 104 can also be determined by using trigonometry methods within an antenna mesh network. The location of the device can further be determined using a combination of antenna mesh networks, sensors, GPS signaling and other indoor positioning systems. In a preferred embodiment, two or more sensors are placed on the parked vehicle 104 and used to record features encountered during vehicular transit. The sensors can be used to detect the longitudinal and lateral direction, wheel speed and angular inclination. The sensors can further be used to photograph attributes in the environment. The location processing unit 804 can be used to process the information obtained by the sensors. In addition, the location processing module 808 can be used to determine the vehicle location based on RF parameters, localization algorithms, and other location processes as discussed above. Additional processing components can also exist within the location processing unit 808 which can perform the signal processing required when using an antenna network mesh. Such digital processing can include those common in heterodyne systems including, but not limited to, components capable of processing signal modulation, transformation, interleaving, puncturing, digital-to-analog conversion, frequency up/down conversion, and slope estimation. Further, the location processing unit 804 can communicate with at least the system I/O Interface for reception of the signal information from the various antenna networks. In addition, modules may also exist (not shown) in FIG. 8 which can be used for other operations such as a controlling module implemented for controlling the operation of a vehicle, etc.

Figure 9:
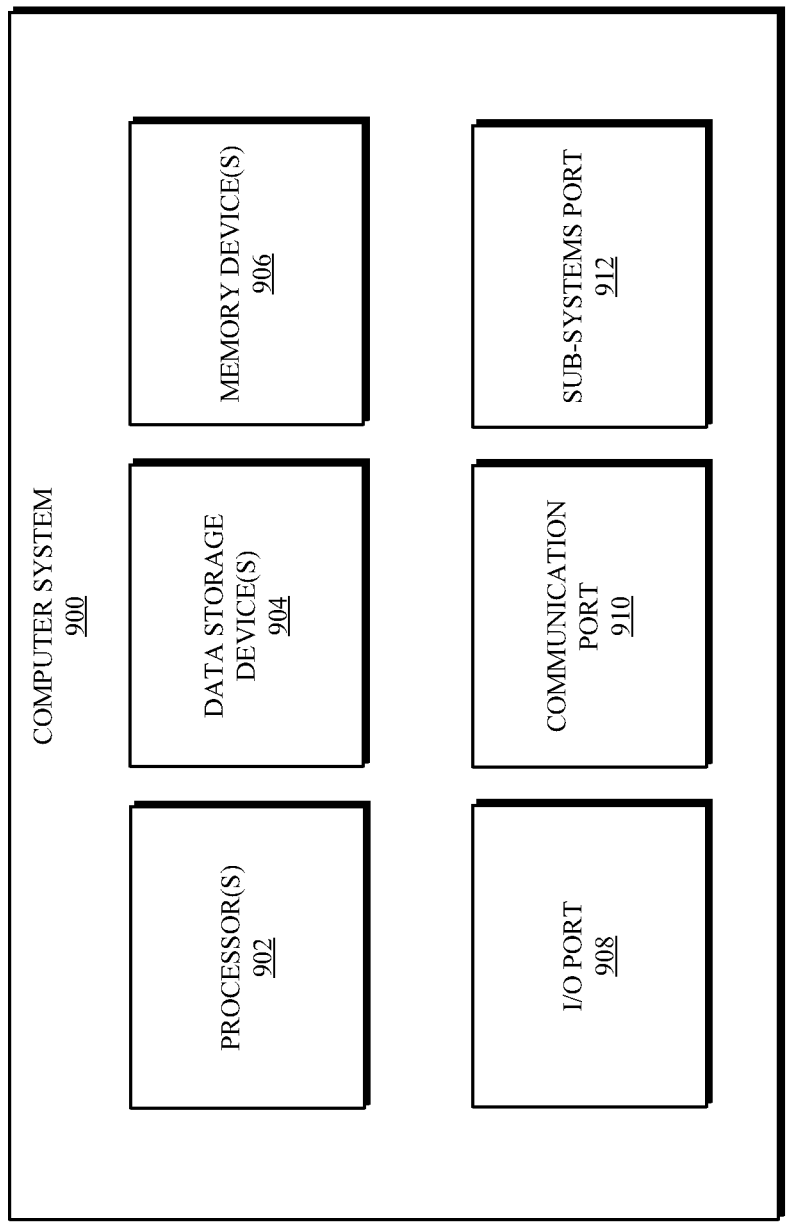
FIG. 9 is a diagram illustrating an example of a computing system which may be used in implementing embodiments of the present disclosure.

Referring to FIG. 9, a detailed description of an example computing system 900 having computing units that may implement various systems and methods discussed herein is provided. The computing system 900 may be applicable to the computer system 220 and other computing or network devices. It will be appreciated that specific implementations of these devices may be of differing possible specific computing architectures not all of which are specifically discussed herein but will be understood by those of ordinary skill in the art.

The computer system 900 may be a computing system that is capable of executing a computer program product to execute a computer process. Data and program files may be input to the computer system 900, which reads the files and executes the programs therein. Some of the elements of the computer system 900 are shown in FIG. 9, including hardware processors 902, data storage devices 904, memory devices 906, and/or ports 908-912. Additionally, other elements that will be recognized by those skilled in the art may be included in the computing system 900 but are not explicitly depicted in FIG. 9 or discussed further herein. Various elements of the computer system 900 may communicate with one another by way of communication buses, point-to-point communication paths, or other communication means not explicitly depicted in FIG. 9.

The processor 902 may include, for example, a central processing unit (CPU), a microprocessor, a microcontroller, a digital signal processor (DSP), and/or internal levels of cache. There may be processors 902, such that the processor 902 comprises a single central-processing unit, or multiple processing units capable of executing instructions and performing operations in parallel with each other, commonly referred to as a parallel processing environment. In addition, these processors can work jointly with the memory 216.

The computer system 900 may be a conventional computer, a distributed computer, or any other type of computer, such as external computers made available via a cloud computing architecture. The presently described technology is optionally implemented in software stored on the data stored device(s) 904, stored on the memory device(s) 906, and/or communicated via the ports 908-912, thereby transforming the computer system 900 in FIG. 9 to a special purpose machine for implementing the operations described herein. Examples of the computer system 900 include personal computers, terminals, workstations, mobile phones, tablets, laptops, personal computers, multimedia consoles, gaming consoles, set top boxes, and the like.

The data storage devices 904 may include any non-volatile data storage device capable of storing data generated or employed within the computing system 900, such as computer executable instructions for performing a computer process, which may include instructions of both application programs and an operating system (OS) that manages the various components of the computing system 900. The data storage devices 904 may include, without limitation, magnetic disk drives, optical disk drives, solid state drives (SSDs), flash drives, and the like. The data storage devices 904 may include removable data storage media, non-removable data storage media, and/or external storage devices made available via a wired or wireless network architecture with such computer program products, including database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The memory devices 606 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in the data storage devices 904 and/or the memory devices 906, which may be referred to as machine-readable media. It will be appreciated that machine-readable media may include any tangible non-transitory medium that is capable of storing or encoding instructions to perform any of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the executable instructions or data structures.

In some implementations, the computer system 900 includes ports, such as an input/output (I/O) port 908, a communication port 910, and a sub-systems port 912, for communicating with other computing, network, or vehicle devices. It will be appreciated that the ports 908-912 may be combined or separate and that more or fewer ports may be included in the computer system 900.

The I/O port 908 may be connected to an I/O device, or other device, by which information is input to or output from the computing system 900. Such I/O devices may include, without limitation, input devices, output devices, and/or environment transducer devices.

In one implementation, the input devices convert a human-generated signal, such as, human voice, physical movement, physical touch or pressure, and/or the like, into electrical signals as input data into the computing system 900 via the I/O port 908. Similarly, the output devices may convert electrical signals received from computing system 900 via the I/O port 908 into signals that may be sensed as output by a human, such as sound, light, and/or touch. The input device may be an alphanumeric input device, including alphanumeric and other keys for communicating information and/or command selections to the processor 902 via the I/O port 908. The input device may be another type of user input device including, but not limited to: direction and selection control devices, such as a mouse, a trackball, cursor direction keys, a joystick, and/or a wheel; sensors, such as a camera, a microphone, a positional sensor, an orientation sensor, a gravitational sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

The environment transducer devices convert one form of energy or signal into another for input into or output from the computing system 900 via the I/O port 908. For example, an electrical signal generated within the computing system 900 may be converted to another type of signal, and/or vice-versa. In one implementation, the environment transducer devices sense characteristics or aspects of an environment local to or remote from the computing device 900, such as, light, sound, temperature, pressure, magnetic field, electric field, chemical properties, physical movement, orientation, acceleration, gravity, and/or the like. Further, the environment transducer devices may generate signals to impose some effect on the environment either local to or remote from the example computing device 900, such as, physical movement of some object (e.g., a mechanical actuator), heating or cooling of a substance, adding a chemical substance, and/or the like.

In one implementation, a communication port 910 is connected to a network by way of which the computer system 900 may receive network data useful in executing the methods and systems set out herein as well as transmitting information and network configuration changes determined thereby. Stated differently, the communication port 910 connects the computer system 900 to communication interface devices configured to transmit and/or receive information between the computing system 900 and other devices by way of wired or wireless communication networks or connections. Examples of such networks or connections include, without limitation, Universal Serial Bus (USB), Ethernet, Wi-Fi, Bluetooth®, Near Field Communication (NFC), Long-Term Evolution (LTE), and so on. Such communication interface devices may be utilized via the communication port 910 to communicate with other machines, either directly over a point-to-point communication path, over a wide area network (WAN) (e.g., the Internet), over a local area network (LAN), over a cellular (e.g., third generation (3G) or fourth generation (4G)) network, or over another communication means. Further, the communication port 910 may communicate with an antenna for electromagnetic signal transmission and/or reception. In some examples, an antenna may be employed to receive Global Positioning System (GPS) data to facilitate determination of a location of a machine, vehicle, or another device.

The computer system 900 may include a sub-systems port 912 for communicating with systems related to a vehicle to control an operation of the vehicle and/or exchange information between the computer system 900 and sub-systems of the vehicle. Examples of such sub-systems of a vehicle, include, without limitation, imaging systems, radar, lidar, motor controllers and systems, battery control, fuel cell or other energy storage systems or controls in the case of such vehicles with hybrid or electric motor systems, autonomous or semi-autonomous processors and controllers, steering systems, brake systems, light systems, navigation systems, environment controls, entertainment systems, and the like.

Users can selectively block use of, or access to, personal data, such as location information. A system incorporating some or all of the technologies described herein can include hardware and/or software that prevents or blocks access to such personal data. For example, the system can allow users to "opt in" or "opt out" of participation in the collection of personal data or portions thereof. Also, users can select not to provide location information, or permit provision of general location information (e.g., a geographic region or zone), but not precise location information.

Entities responsible for the collection, analysis, disclosure, transfer, storage, or other use of such personal data should comply with established privacy policies and/or practices. Such entities should safeguard and secure access to such personal data and ensure that others with access to the personal data also comply. Such entities should implement privacy policies and practices that meet or exceed industry or governmental requirements for maintaining the privacy and security of personal data. For example, an entity should collect users' personal data for legitimate and reasonable uses and not share or sell the data outside of those legitimate uses. Such collection should occur only after receiving the users' informed consent. Furthermore, third parties can evaluate these entities to certify their adherence to established privacy policies and practices.

The system set forth in FIG. 9 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

Note that the embodiments of the present disclosure include various operations or steps. The steps may be performed using information from hardware components, and may be embodied in hardware components or may be embodied in machine-executable instructions, which may be used to cause a general-purpose or special-purpose processor (e.g., a processing unit of the mobile device) executing the instructions to perform the steps. Alternatively, the steps may be performed by a combination of hardware, software and/or firmware.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium; magneto-optical storage medium, read only memory (ROM); random access memory (RAM); erasable programmable memory (e.g., EPROM and EEPROM); flash memory; or other types of medium suitable for storing electronic instructions.

Note that the embodiments of the present disclosure include various operations or steps. The steps may be performed using information from hardware components, and may be embodied in hardware components or may be embodied in machine-executable instructions, which may be used to cause a general-purpose or special-purpose processor (e.g., a processing unit of the mobile device) executing the instructions to perform the steps. Alternatively, the steps may be performed by a combination of hardware, software and/or firmware.

While the present disclosure has been described with reference to various implementations, it will be understood that these implementations are illustrative and that the scope of the disclosure is not limited to them. Many variations, modifications, additions, and improvements are possible. More generally, implementations in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method for locating a device, the method comprising:
obtaining first location information of the device, the first location information associated with a first point at which the device loses a Global Positioning System (GPS) signal;
obtaining second location information of the device, the second location information associated with a travel of the device from the first point at which the device loses the GPS signal to a second point at which the travel of the device ceases;
obtaining third location information of the device, the third location information associated with a known feature in an image captured by the device; and
determining a location of the device based on the first location information, the second location information, and the third location information.

2. The method of claim 1, wherein the image is captured after the first point at which the device loses the GPS signal.

3. The method of claim 2, wherein the image is captured before the second point at which the travel of the device ceases.

4. The method of claim 2, wherein the image is captured at the second point at which the travel of the device ceases.

5. The method of claim 1, further comprising:
generating an indication of a direction to the location from a current location.

6. The method of claim 5, wherein the indication of the direction includes a route to the location of the device from the current location.

7. The method of claim 1, further comprising:
presenting the indication of the direction to the location using a second device.

8. The method of claim 1, wherein the location includes a spot on a level in a building structure, the building structure identified based on the first location information, the level identified based on the second location information, and the spot identified based on the third location information.

9. The method of claim 8, wherein the building structure is a parking structure, the level is a parking level, and the spot is a parking spot.

10. The method of claim 1, wherein the second location information includes one or more of an elapsed time, a distance change, and an elevation change during the travel of the device.

11. A system for locating a device, the system comprising:
a Global Positioning System (GPS) receiver of the device configured to receive a GPS signal, first location information of the device determined based on a first point at which the GPS receiver of the device loses the GPS signal;
one or more motion sensors of the device, second location information of the device determined based on a travel of the device from the first point at which the GPS receiver of the device loses the GPS signal to a second point at which travel of the device ceases;
a camera of the device, third location information of the device determined based on a known feature in an image captured by the camera; and
a computing system determining a location of the device based on the first location information, the second location information, and the third location information.

12. The system of claim 11, wherein the one or more motion sensors includes at least one of a wheel sensor, an accelerometer, an inertial measurement unit, or an odometer.

13. The system of claim 11, wherein a second device is in communication with the computing system, the second device associated with a current location.

14. The system of claim 13, wherein an indication of a direction to the location is presented using the second device, the indication of the direction determined based on the current location and the location.

15. The system of claim 14, wherein the indication of the direction includes a route.

16. The system of claim 14, wherein the indication of the direction includes one or more directional prompts.

17. The system of claim 16, wherein the one or more directional prompts include one or more visual prompts.

18. A method for locating a device, the method comprising:
obtaining a location of the device determined based on first location information, second location information, and third location information, the first location information associated with a first point at which the device loses a Global Positioning System (GPS) signal, the second location information associated with a travel of the device from the first point at which the device loses the GPS signal to a second point at which the travel of the device ceases, and the third location information associated with a known feature in an image captured by the device;
determining a current location of a second device; and
generating an indication of a direction to the location from the current location.

19. The method of claim 18, wherein the current location is determined based on at least one of: a trigonometric identify from detected radio frequency waves; using one or more antennas in a triangulation localization process; using an antenna mesh network; or using one or more images captured using an image sensor.

20. The method of claim 18, wherein the indication of the direction to the location is presented with the second device.

* * * * *